United States Patent [19]

Kiehl et al.

[11] 4,218,254

[45] Aug. 19, 1980

[54] REFRACTORY COMPOSITIONS SUITABLE FOR PREPARING LOW WATER-CONTENT INJECTABLE PASTES

[75] Inventors: Jean-Pierre Kiehl, Lyons; Bernard A. Clavaud, Saint Pierre de Chandieu, both of France

[73] Assignee: Societe Europeenne des Produits Refractaires, Neuilly-sur-Seine, France

[21] Appl. No.: 18,770

[22] Filed: Mar. 8, 1979

[30] Foreign Application Priority Data

Mar. 21, 1978 [FR] France .............................. 78 08143

[51] Int. Cl.² .............................................. C04B 35/52
[52] U.S. Cl. ........................................ 106/44; 106/55; 106/56; 106/57; 106/58; 106/59; 106/65; 106/66
[58] Field of Search ....................... 106/44, 55, 56, 57, 106/58, 59, 65, 66, 67, 68, 69

[56] References Cited

U.S. PATENT DOCUMENTS

3,274,008   9/1966   Braunwarth et al. ................. 106/65

Primary Examiner—James Poer
Attorney, Agent, or Firm—Watson, Cole, Grindle & Watson

[57] ABSTRACT

The invention relates to produced refractory compositions comprising the four following particulate fractions:

(1) 30–60% by weight of a coarse fraction at least 50% of which are greater than 0.5 mm;
(2) 10–30% by weight of a fine fraction at least 50% of which are smaller than 75 microns;
(3) 10–30% by weight of a very fine fraction at least 50% of which are smaller than 5 microns; and
(4) 10–30% by weight of an ultra fine fraction at least 80% of which are smaller than 0.1 micron;

the fractions being comprised of materials which are inert to water. The refractory compositions, when mixed with less than 10% by weight of water, give injectable pastes suitable for repairing refractory furnace linings.

9 Claims, No Drawings

REFRACTORY COMPOSITIONS SUITABLE FOR PREPARING LOW WATER-CONTENT INJECTABLE PASTES

BACKGROUND OF THE INVENTION

The present invention relates to refractory compositions useful for making injectable pastes having a very low water content.

Refractory pastes are commonly produced by refractory manufacturers, these pastes functioning as repairing pastes intended for injection into various steel-making, petrochemical or other equipment whenever a hot spot appears on a steel wall thereof. These hot spots can result from the partial destruction of the refractory lining or merely from the opening of one or more joints which allows the passage therethrough of hot gases.

This injection technique is commonly practiced, for example, on blast furnaces, cowpers, hot gas ducts, primary or secondary petrochemical furnaces, transfer lines and the like.

Heretofore, the injected refractory pastes were mixtures of clay and chamotte in which were sometimes added a varying amount of refractory cements. For obtaining suitable injectable pastes, i.e. pastes capable of flowing into the cracks or the damaged lining, it was necessary to incorporate in the pastes more than 15% by weight of water, usually more than 25% by weight of water and, in some cases, more 30% by weight of water. These high water contents result in hardened and fired refractory masses or bodies which have porosities higher than 30% and, sometimes, up to 40%.

These known refractory pastes exhibit thus two important drawbacks:
- low strength due to the fact that the high water amount in the pastes gives, after drying and possible setting, porous products;
- easy creation of additional cracks therein since the sudden release of this high water amount in the paste when the paste is injected into a hot lining tends to create in the injected mass channels which are the source of incipient cracks for new cracks or passages for the hot gases.

In order to overcome these drawbacks, it was often necessary, after a first filling in by injection, to make a second and even a third injection for gradually plugging the native channels in the injected mass.

The present invention has for its object the provision of powdered refractory compositions which require, for the preparation of injectable pastes, only a reduced water proportion, in any case lower than 10% by weight, preferably comprised between 4 and 8% by weight, these pastes undergoing a total shrinkage, after drying and ceramic setting, of lower than 2%, preferably lower than 1%.

SUMMARY OF THE INVENTION

The compositions of the invention comprise four essential constituents:
(1) 30 to 60%, preferably 40 to 50% by weight of a coarse fraction comprised of grains at least 50% of which are greater than 0.5 mm, the greatest grains being not greater than 10 mm, preferably 6 mm;
(2) 10 to 30%, preferably 15 to 25%, by weight of a fine fraction comprised of particles at least 50% of which are smaller than 75 microns, the finest particles being not smaller than 10 microns;
(3) 10 to 30%, preferably 15 to 25%, by weight of a very fine fraction comprised of particles at least 50% of which are smaller than 5 microns, the finest particles being not smaller than 0.1 micron; and
(4) 10 to 30%, preferably 15 to 25%, by weight of an ultra fine fraction comprised of particles at least 80% of which are smaller than 0.1 micron, the finest particles being not smaller than 0.01 micron;
the fractions (1) to (4) being comprised of natural or synthetic inorganic materials which are inert to water.

The nature of the inorganic materials constituting the fractions (1), (2) and (3) is not critical and it is sufficient that the materials be inert to water. The fractions (1), (2) and (3) can be comprised of similar or different materials. As illustrative examples, the fractions (1), (2) and (3) can be comprised of materials independently selected among the group consisting of clay chamotte (i.e. fired clay), gibbsite, quartzite, alumina (corundum), magnesia, chromite, graphite, silicon carbides, silicon nitrides, silicon oxinitrides, "sialons" (ceramic materials comprised of solid solutions of $AL_2O_3$ in silicon nitride $Si_3N_4$), silicates, sand, refractory materials based on one or more metal oxides, powdered metals, and the like.

The selection of the particular material(s) to be used for constituting the fractions (1), (2) and (3) will be dependent upon the temperature and the conditions to which the injected paste will be submitted in service, as well as, as this is obvious, upon economic considerations. At the present time, it is preferred to use clay chamotte when the temperature encountered in service do not exceed substantially about 1000° C., and alumina for higher temperatures (up to about 1500° C.)

The fractions (1), (2) and (3) can be easily produced by mechanical grinding of the selected materials, followed by a suitable sieving.

The ultra fine fraction (4), made chiefly of particles smaller than 0.1 micron, can be comprised, for example, of silica, chromium oxide $Cr_2O_3$, titanium dioxide, zirconia, silicon carbides, silicon nitrides, silicon oxinitrides and the like. Alumina cannot be used for constituting the fraction (4) because it is not possible to prepare ultra fine alumina particles which are inert to water.

The ultra fine fraction (4) cannot be produced generally by mechanical grinding or milling of the selected material. The usable ultra fine powders can be obtained by known processes of dissociation or hydrolysis of certain metal compounds (such as halides) in vapor phase, of condensation from the vapor phase, or of precipitation from solutions in the cases of oxides such as silica, chromium oxide, titanium dioxide and zirconia. Ultra fine vitreous silica is also produced, as a by-product, in certain commercial processes as in the reduction of zirconium silicate into zirconia or in the preparation of ferro-silicon (the dusts of the electric furnaces contain suitable silica). Ultra fine powders of silicon carbides, nitrides or oxinitrides can be prepared by pulverization by means of a plasma torch.

Ultra fine powders which are usable as constituent (4) are commercially available or can be made suitable for use in the compositions of the invention by a moderate firing so as to render them inert to water.

The constituents (1) to (4) should be inert to water in order not to form any colloid which, by swelling, would retain water.

For preparing injectable pastes from the compositions of the invention, these latters are mixed with a water amount lower than 10% by weight, preferably comprised between 4 and 8% by weight, so as to obtain a homogeneous paste which flows by gravity. These pastes can be carried on by any types of pumps for viscous fluids, such as piston pumps and the like.

In order to improve the wetting of the composition by water, a small amount (for example a few tenths of a percent) of organic or inorganic dispersing agents, for example of alkaline metal phosphates such as sodium tripolyphosphate, can be added to the water to be mixed with the composition of the invention.

The resultant pastes harden through ceramic setting (sintering) from temperatures in the range of 800°–1000° C. The setting can be accelerated, if desired, by adding to the composition a few percents of a setting accelerator such as alkaline metal silicate, phosphoric acid, hydraulic cements and the like.

The ability of the present compositions to form injectable pastes giving, after injection and firing, low shrinkage materials (less than 2% and preferably less than 1%) seems to result from the very good filling of the voids existing between the particles of a given fraction by the particles of the smaller fraction, as shown by the fact the porosity of the fired materials is always lower than 25% and preferably in the vicinity of 20%. Also, the ultra fine particles seems to act as tiny "ball bearings38 which permits to obtain pastes having an excellent flowability in spite of the low amount of water used, and to allow the injection thereof under relatively low pressures.

The following examples are given for illustrating the present invention.

EXAMPLE 1

Injectable paste based on clay chamotte

| Composition by weight: | 48% of clay chamotte containing 42% of alumina and passing through a 2 mm sieve; |
|---|---|
| | 20% of clay chamotte containing 42% of alumina and having a particle size such that 50% of the particles are smaller than 75 microns; |
| | 16% of fired alumina having a particle size lower than 5 microns; |
| | 12% of condensed silica having a particle size lower than 0.1 micron; |
| | 4% of Secar ® 250 cement (sold by Lafarge). |
| | 100% |

The condensed silica having a particle size lower than 0.1 micron had been recovered in the electric furnaces of the manufacture of ferro-silicon. Water amount added for the preparation of a paste injectable under a 20 bar pressure . . . 7% by weight.

| Physical properties after injection and firing: | | |
|---|---|---|
| at 150° C.: | apparent density | : 2.15 |
| at 1000° C.: | apparent density | : 2.15 |
| | open porosity | : 22% |
| | compressive strength | : 400 kg/cm$^2$ |
| | shrinkage | : <0.2% |

EXAMPLE 2

Injectable paste based on quartzite

| Composition by weight: | 48% of quartzite passing through a 2 mm sieve; |
|---|---|
| | 20% of quartzite having a particle size such that 50% of the particles are lower than 75 microns; |
| | 16% of re-milled sand having a particle size lower than 5 microns; |
| | 12% of condensed silica having a particle size lower than 0.1 micron; |
| | 4% of H$_3$PO$_4$ |
| | 100% |

Water amount added for the preparation of a paste injectable under a 20 bar pressure . . . 6.5% by weight.

| Physical properties after injection and firing: | | |
|---|---|---|
| - at 150° C.: | apparent density | : 2.06 |
| - at 1000° C.: | apparent density | : 2.04 |
| | open porosity | : 20.8% |
| | compressive strength | : 300 kg/cm$^2$ |
| | shrinkage | : <0.2% |

EXAMPLE 3

Injectable paste based on alumina (corndum) and chromium oxide (Crhd 2O$_3$)

| Composition by weight: | 44% of fused cast Al$_2$O$_3$ passing through a 1.5 mm sieve; |
|---|---|
| | 18% of fused cast Al$_2$O$_3$ having a particle size such that 50% of the particles are lower than 75 microns; |
| | 16% of fired alumina having a particle size lower than 5 microns; |
| | 18% of Cr$_2$O$_3$ having a particle size lower than 0.1 micron; |
| | 4% of H$_3$PO$_4$ |
| | 100% |

The Cr$_2$O$_3$ having a particle size lower than 0.1 micron has been obtained by precipitation from a solution, then firing at 700° C. Water amount added for the preparation of a paste injectable under a 20 bar pressure . . . 4.6% by weight

| Physical properties after injection and firing: | | |
|---|---|---|
| - at 150° C.: | apparent density | : 2.85 |
| - at 1000° C.: | apparent density | : 2.89 |
| | open porosity | : 20.1% |
| | compressive strength | : 600 kg/cm$^2$ |
| | shrinkage | : <0.2% |

EXAMPLE 4

Injectable paste based on SiC

| Composition by weight: | 48% of hexagonal SiC passing through a 3 mm sieve; |
|---|---|
| | 18% of hexagonal SiC having a |

```
                particle size such that 50% of
                the particles are lower than
                75 microns;
         18%   of cubic SiC having a particle
                size lower than 5 microns;
         12%   of cubic SiC having a particle
                size lower than 0.08 micron;
          4%   of H3PO4
        100%
```

The cubic SiC having a particle size lower than 0.08 micron had been obtained by pulverizing with a plasma torch. Water amount added for the preparation of a paste injectable under a 20 bar pressure . . . 4.8% by weight

| Physical properties after injection and firing: | | |
|---|---|---|
| - at 150° C.: | apparent density | : 2.3 |
| - at 1000° C.: | apparent density | : 2.3 |
|  | open porosity | : 21% |
|  | compressive strength | : 250 kg/cm² |
|  | shrinkage | : <0.2% |

We claim:

1. Refractory compositions suitable for preparing injectable pastes, which comprise the following essential constituents:
   (1) 30 to 60% by weight of a coarse fraction comprised of grains at least 50% of which have a particle size greater than 0.5 mm, the greatest grains being not greater in size than 10 mm, said course fraction being comprised of natural or synthetic inorganic materials which are inert to water;
   (2) 10 to 30% by weight of a fine fraction comprised of particles at least 50% of which have a particle size smaller than 75 microns, the finest particles being not smaller in size than 10 micron, said fine fraction being comprised of natural or synthetic inorganic materials which are inert to water;
   (3) 10 to 30% by weight of a very fine fraction comprised of particles at least 50% of which have a particle size smaller than 5 microns, the finest particles being not smaller in size than 0.1 micron, said very fine fraction being comprised of natural or synthetic inorganic materials which are inert to water; and
   (4) 10 to 30% by weight of an ultra fine fraction comprised of particles at least 80% of which have a particle size smaller than 0.1 micron, the finest particles being not smaller in size than 0.1 micron, said ultra fine particles being selected from the group consisting of silica, chromium oxide $Cr_2O_3$, titanium dioxide, zirconia, silicon carbides, silicon nitrides and silicon oxinitrides which are inert to water.

2. Refractory compositions as claimed in claim 1, wherein the constituent (1) is present in an amount of 40 to 50% by weight, and the constituents (2), (3) and (4) are each present in an amount of 15 to 25% by weight.

3. Refractory compositions as claimed in claim 1, wherein the constituents (1), (2) and (3) are comprised of identical or different materials independently selected among the group consisting of clay chamotte, gibbsite, quartzite, alumina, magnesia, chromite, graphite, silicon carbides, silicon nitrides, silicon oxinitrides, sialons, silicates, sand, refractory materials based on one or more metal oxide(s), and powdered metals.

4. Refractory compositions as claimed in claim 3, wherein at least one of the constituents (1), (2) and (3) is comprised of clay chamotte or alumina.

5. Refractory compositions as claimed in claim 1, which further comprise a small amount of a setting accelerator.

6. Injectable pastes comprised of a refractory composition as claimed in claim 1, mixed with less than 10% by weight of water.

7. Injectable pastes as claimed in claim 6, wherein the amount of water is comprised between 4 and 8% by weight.

8. Injectable pastes as claimed in claim 6, wherein the mixed water contains a small amount of a dispersing agent.

9. Injectable pastes as claimed in claim 6, which exhibit, after drying and ceramic setting, a total shrinkage lower than 2%, and give fired refractory masses having a porosity lower than 25%.

* * * * *

UNITED STATES PATENT OFFICE
CERTIFICATE OF CORRECTION

PATENT NO. : 4,218,254
DATED : August 19, 1980
INVENTOR(S) : Jean-Pierre Kiehl et al It is certified that error appears in the above-identified patent and that said Letters Patent are hereby corrected as shown below:

In column 5, line 32, the word "course" should be --coarse--.

In column 6, line 7, the term "0.1" should be --0.01--.

*Signed and Sealed this*

*Twenty-fourth* Day of *March 1981*

[SEAL]

*Attest:*

RENE D. TEGTMEYER

*Attesting Officer*   *Acting Commissioner of Patents and Trademarks*